(12) United States Patent
Alder

(10) Patent No.: US 6,358,138 B1
(45) Date of Patent: Mar. 19, 2002

(54) SIDE WINDOW DEFROSTER/DEFOGGER

(75) Inventor: Randall F. Alder, Fenton, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/742,932

(22) Filed: Dec. 20, 2000

(51) Int. Cl.$^7$ .................................................. B60S 1/54
(52) U.S. Cl. .................................... 454/124; 296/146.7
(58) Field of Search ................................ 454/124, 127, 454/198, 85, 93, 903; 296/146.1, 146.7 152

(56) References Cited

U.S. PATENT DOCUMENTS

| | | |
|---|---|---|
| 2,133,488 A | 10/1938 | Stearns |
| 2,150,110 A | 3/1939 | Strauss et al. |
| 2,640,231 A | 6/1953 | Berger |
| 3,602,126 A | 8/1971 | Breitschwerdt |
| 3,715,966 A * | 2/1973 | Miettinen .................... 454/124 |
| 3,716,966 A | 2/1973 | De Seversky |
| 3,791,693 A | 2/1974 | Hellriegel et al. |
| 4,173,174 A | 11/1979 | Vinko et al. |
| 4,512,240 A | 4/1985 | Mahler et al. |
| 5,354,114 A * | 10/1994 | Kellman et al. ............. 296/192 |
| 5,591,078 A | 1/1997 | Filion et al. |
| 6,135,874 A * | 10/2000 | Weber ......................... 454/124 |

* cited by examiner

Primary Examiner—Harold Joyce
Assistant Examiner—Derek S. Boles
(74) Attorney, Agent, or Firm—Reising, Ethington, Barnes, Kisselle, Learman & McCulloch, P.C.

(57) ABSTRACT

A system for defogging/defrosting an automobile side window, which extends upwardly from an interior panel, in which a window strip extends along an upper edge of the interior panel between the panel and the window. The window strip includes a length of hollow tubing having a flange integrally extending upwardly adjacent to the interior window surface, a plurality of longitudinally spaced openings along an upper surface of the tubing on a side of the flange remote from the window, a fitting at one end of the tubing for connection to a vehicle HVAC system and a cap at the opposing end of the tubing. In the preferred embodiment, the flange tapers narrowingly to an edge in abutment with the window. Air from a vehicle HVAC system fed into the tubing is directed through the openings upwardly along the interior surface of the window for defogging/defrosting the window. The flange in engagement with the window interior surface prevents moisture from flowing downwardly past the window strip. This flange is particularly advantageous when employed in conjunction with a vehicle side window that may be raised and lowered, in that the flange also functions as a wiper in sliding engagement with the window interior surface. Any moisture wipe d from the interior surface of the window may flow through the openings into the tubing for subsequent evaporation.

11 Claims, 1 Drawing Sheet

SIDE WINDOW DEFROSTER/DEFOGGER

The present invention is directed to a system and method for defrosting/defogging the inside surface of a side window in an automotive vehicle.

SUMMARY OF THE INVENTION

It is a general object of the present invention to provide a system and method for directing air from a vehicle HVAC system onto the interior surface of a vehicle side window for defrosting and defogging the vehicle side window during inclement weather. Another and more specific object of the present invention is to provide a system and method of the described character in which the defogger/defroster is in abutting engagement with the side window interior surface to prevent moisture or other debris from entering the vehicle space between interior and exterior side panels of the vehicle.

A system for defogging/defrosting an automobile side window, which extends upwardly from an interior vehicle panel, includes a window strip extending along an upper edge of the interior panel between the panel and the window. The window strip is in the form of a length of hollow tubing having a flange integrally extending upwardly adjacent to the interior window surface, a plurality of longitudinally spaced openings along an upper surface of the tubing on a side of the flange remote from the window, a fitting at one end of the tubing for connection to a vehicle HVAC system and a cap at the opposing end of the tubing. In the preferred embodiment, the flange tapers narrowingly to an edge in abutment with the window. Air from a vehicle HVAC system fed into the tubing is directed through the openings upwardly along the interior surface of the window for defogging/defrosting the window. The flange in engagement with the window interior surface prevents moisture from flowing downwardly past the window strip. This flange is particularly advantageous when employed in conjunction with a vehicle side window that may be raised and lowered, in that the flange also functions as a wiper in sliding engagement with the window interior surface. Any moisture wiped from the interior surface of the window may flow through the openings into the tubing for subsequent evaporation.

A method of defrosting/delogging an automobile side window in accordance with another aspect of the present invention involves providing a window strip in the form of a length of flexible hollow tubing having an integrally formed flange extending tangentially from the tubing. Openings are formed in a sidewall of the tubing adjacent to the flange and the tubing is cut to desired length. The cut tubing is positioned between a vehicle side window and an opposing edge of a vehicle interior panel such that the flange extends upwardly in abutment with the side window. The tubing is connected to a vehicle HVAC system, so that air from the system is directed along the tubing and upwardly through the openings along an interior surface of the window to defrost/defog the window.

A window strip for defrosting/defogging a vehicle side window in accordance with a further aspect of the invention includes a length of hollow tubing having an integrally formed flange extending tangentially from a sidewall of the tubing. A plurality of openings extend through the tubing sidewall interiorly adjacent to the flange, and a fitting at one end of the tubing provides for connection to a vehicle HVAC system. In the preferred embodiment, the flange tapers narrowingly to a sharp edge on a side of the flange remote from the openings, and a cap is positioned on the end of the tubing remote from the fitting. The tubing and integral flange are preferably of flexible resilient construction, such as rubber or plastic.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
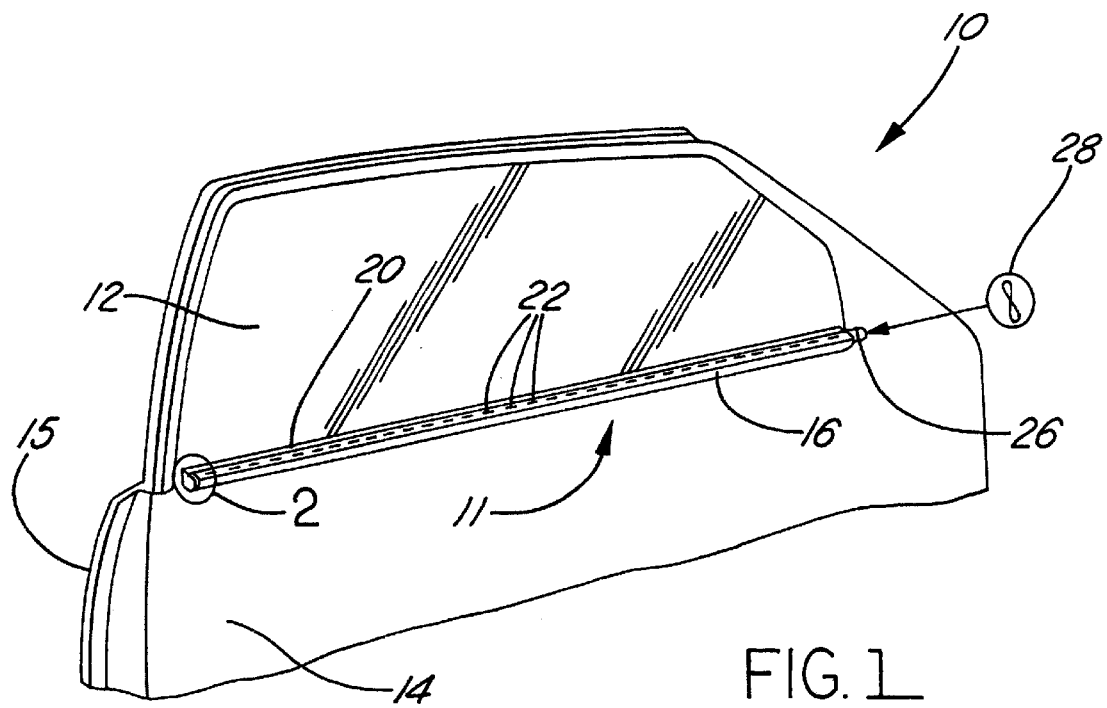
FIG. 1 is an interior perspective view of an automobile side door equipped with a side window defogger/defroster system in accordance with a presently preferred embodiment of the invention.
Figure 2:
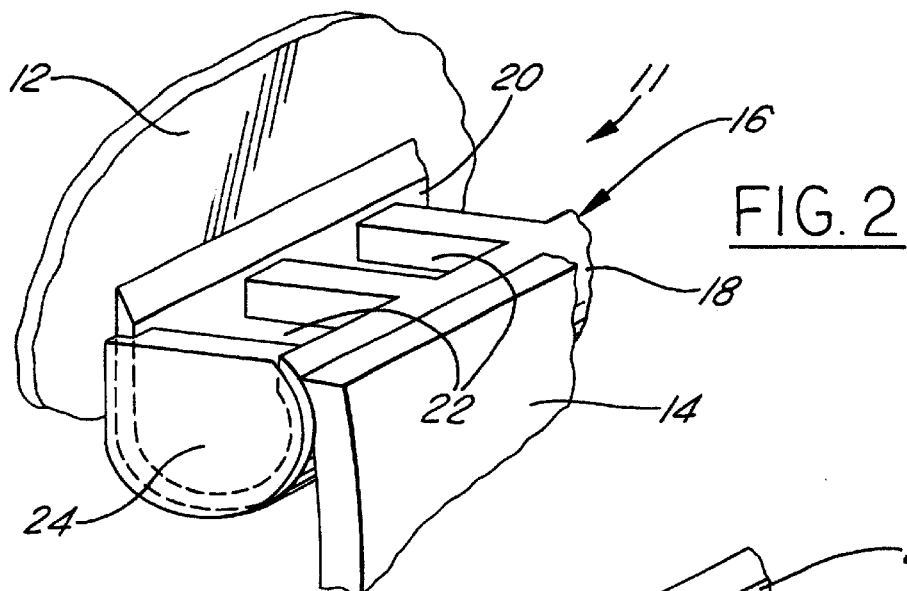
FIG. 2 is a fragmentary perspective view on an enlarged scale of the portion of FIG. 1 within the circle 2.

FIGS. 1 and 2 illustrate an automobile driver's side door 10 equipped with a defogger/defroster system 11 in accordance with a presently preferred embodiment of the invention. Door 10 has a side window 12 that extends upwardly from a door body having an interior panel 14 and an exterior panel 15. A window strip 16 in accordance with the present invention is secured to the upper edge of door panel 14, and extends lengthwise along window 12 between the interior surface of window 12 and the upper edge of interior door panel 14. Window strip 16 includes an elongated body 18 in a form of a length of hollow tubing. A flange 20 integrally tangentially extends upwardly from the sidewall of tubing body 18 in parallel abutting engagement with the interior surface of window 12 and on a side of strip 16 remote from door panel 14. Flange 20 tapers narrowingly away from tubing body 18 to a sharp point in parallel abutting engagement with the window interior surface. That is, at the point or area of contact between the edge of flange 20 and the interior surface of window 12, flange 20 is generally parallel to the window surface. A plurality of openings 22 are formed in the sidewall of tubing body 18 interiorly adjacent to flange 20. That is, tangential orientation of flange 20 configures the flange as a closed flange with respect to the adjacent upper surface of tubing body 18 in which openings 22 are formed. A cap 24 is secured to one end of tubing body 18 and a fitting 26 (FIG. 1) extends from the opposing end of the tubing body for connection to a vehicle HVAC system 28.

Figure 3:
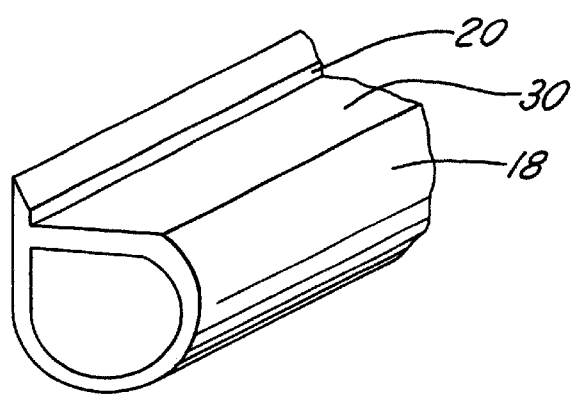
FIG. 3 is a fragmentary perspective view of the window strip in the system of FIGS. 1 and 2 at an intermediate stage of manufacture.

Tubing body 18 may be extruded or otherwise formed in any suitable cross sectional configuration. The configuration illustrated in FIG. 3, by way of example, has a generally cylindrical body with a flat chordal wall portion 30 perpendicular to flange 20. Other cross sections are envisioned, such as cylindrical or oval. The tube body may be formed with a lip for securement over door panel 14, or a rib for securement within a channel on door panel 14. The tubing body and flange are integrally formed, preferably of flexible resilient construction such as rubber or plastic. Openings 22 (FIGS. 1 and 2) are formed in flat sidewall portion 30 of tubing body 18 in a suitable punching or piercing operation and at a spacing coordinated with desired use. Such spacing may or may not be uniform axially of the tube. Openings 20 are preferably of the same size to facilitate manufacture, although openings 22 of differing size may be implemented in accordance with the present invention in its broadest aspects. Openings 22 may be of any suitable geometry, with square openings being shown for purposes of illustration. The spacing and/or size of the openings may be coordinated with the geometry of the window with which the tubing body is to be associated for optimum defogging/defrosting effect. Air valves or vents may be part of HVAC system 28 (FIG. 1) for selectively directing air onto side window 12 and for controlling the volume of such air.

Flange 20 prevents any moisture on the interior surface of window 12 from draining into the interior of door 10 and potentially causing rust and corrosion. Although the invention illustrated in the drawings maybe employed in connection with non-movable side windows, flange 20 is particularly useful in conjunction with side windows 12 that may be selectively raised and lowered. Flange 20 is in sliding engagement with the interior surface of the window, so that the sharp edge of the flange tapering cross section wipes the window interior surface as the window is lowered. Any moisture removed from the window interior surface is collected on or in wiper 16 for later evaporation.

There have thus been disclosed a system, method and window strip for defogging/defrosting an automobile side window that fully satisfy all of the objects and aims previously set forth. The invention has been disclosed in conjunction with a presently preferred embodiment thereof, and various modifications and variations have been described. Other modifications and variations will readily suggest themselves to persons of ordinary skill in the art. The invention is intended to embrace all such modifications and variations as fall within the spirit and broad scope of the appended claims.

What is claimed is:

1. A system for defogging/defrosting an automobile side window, in which the window extends upwardly from an interior panel, which comprises a length of window strip extending along an upper edge of said panel between said panel and said window, said window strip comprising a length of hollow tubing of flexible resilient construction having a flange integrally extending upwardly in abutment with said window, a plurality of longitudinally spaced openings along an upper surface of said tubing on a side of said flange remote from said window, a fitting at one end of said tubing for connection to a vehicle HVAC system and a cap at an opposing end of said tubing.

2. The system set forth in claim 1 wherein said flange tapers narrowingly to an edge in abutment with said window.

3. The system set forth in claim 2 wherein said tubing has a cylindrical body from which said flange integrally tangentially extends.

4. The system set forth in claim 3 wherein said cylindrical body has a flat chordal wall perpendicular to said flange and in which said openings are disposed.

5. A method of defrosting/defogging an automobile side window, which comprises the steps of:

(a) providing a window strip in the form of a length of hollow tubing having an integrally formed flange extending tangentially from said tubing, (b) forming openings in a sidewall of said tubing adjacent to said flange, (c) cutting said tubing to a desired length, (d) positioning said tubing between a vehicle side window and an edge of a vehicle interior panel such that said flange extends upwardly in abutting engagement with the window, and (e) connecting said tubing to a vehicle HVAC system so that air from said system is directed upwardly through said openings along an interior surface of said window to defrost/defog said window.

6. A window strip for defrosting/defogging a vehicle side window, which comprises a length of hollow tubing having an integrally formed flange extending tangentially from a sidewall of said tubing, a plurality of openings extending through the tubing sidewall interiorly adjacent to said flange, and means at one end of said tubing for connection to a vehicle HVAC system.

7. The strip set forth in claim 6 wherein said flange tapers narrowingly to a sharp edge on a side of said flange remote from said openings.

8. The strip set forth in claim 7 further comprising a cap on an end of said tubing remote from said means.

9. The strip set forth in claim 7 wherein said tubing and integral flange are of flexible resilient construction.

10. The strip set forth in claim 9 wherein said tubing has a cylindrical body from which said flange integrally tangentially extends.

11. The strip set forth in claim 10 wherein said cylindrical body has a flat chordal wall perpendicular to said flange and in which said openings are disposed.

* * * * *